United States Patent [19]

Garcea

[11] 4,324,214
[45] Apr. 13, 1982

[54] COMBUSTION CHAMBER FOR AN INTERNAL COMBUSTION ENGINE

[75] Inventor: Giampaolo Garcea, Milan, Italy

[73] Assignee: Alfa Romeo S.p.A., Milan, Italy

[21] Appl. No.: 124,944

[22] Filed: Feb. 26, 1980

[30] Foreign Application Priority Data

Mar. 8, 1979 [IT] Italy ............................... 20825 A/79

[51] Int. Cl.³ ............................................. F02F 3/28
[52] U.S. Cl. ................................. 123/309; 123/193 P; 123/661; 123/666
[58] Field of Search ........... 123/193 R, 193 C, 193 P, 123/657, 661, 664–666, 671, 306, 309

[56] References Cited

U.S. PATENT DOCUMENTS

| 3,416,501 | 12/1968 | Castelet | 123/306 |
| 3,444,852 | 5/1969 | Henry-Biabaud | 123/657 |
| 4,162,661 | 7/1979 | Nakanishi et al. | 123/661 |

FOREIGN PATENT DOCUMENTS

| 1093138 | 11/1960 | Fed. Rep. of Germany | 123/193 P |
| 1451643 | 3/1969 | Fed. Rep. of Germany | 123/307 |

*Primary Examiner*—Craig R. Feinberg
*Attorney, Agent, or Firm*—Charles E. Brown

[57] ABSTRACT

An internal combustion engine comprises a combustion chamber located between a spherical-cup bottom wall of the engine head and a crown top wall of the piston. The crown wall includes of five wall portions, of which first and second side portions are convex, third and fourth side portions are flat, and a fifth central portion is concave.

8 Claims, 9 Drawing Figures

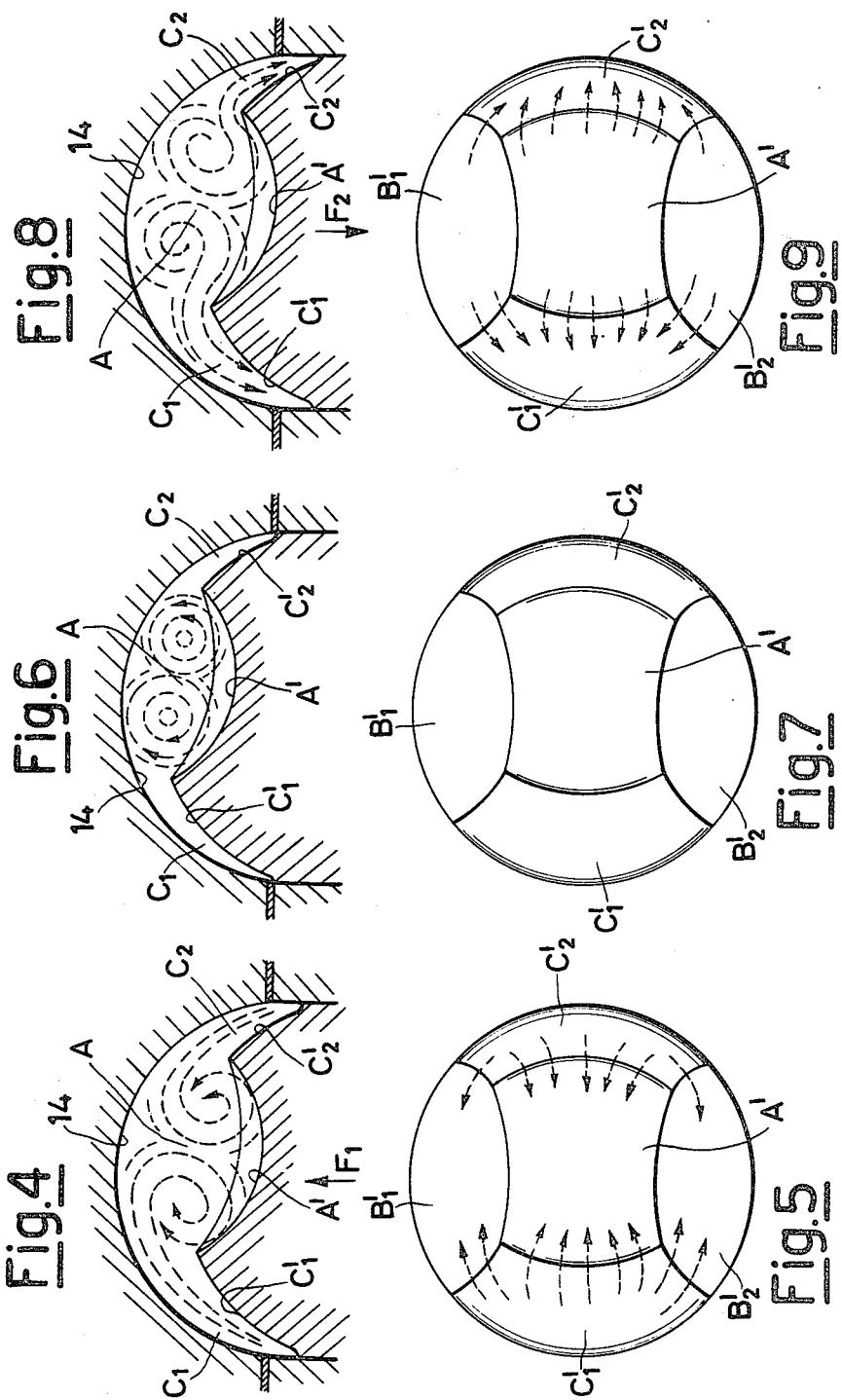

COMBUSTION CHAMBER FOR AN INTERNAL COMBUSTION ENGINE

Mixture ignition and combustion can both be facilitated and improved inside the combustion chamber and cylinder of a reciprocating internal combustion engine by a particular internal turbulence, i.e. by the presence of internal motion in the mixture and/or gas of particular directions and intensity.

With regard to ignition, this derives essentially from the fact that the mixture is never perfectly homogeneous, i.e. of identical composition at all its points, and in many cases it is in fact far from homogenous.

The result is that when the spark is struck between the sparking plug electrodes, if the mixture portion which at that moment is located between the electrodes is too weak (air/petrol ratio much higher than the stoichiometric) or contains an excessive percentage of burnt gas (due to internal recycling of external recycling of burnt gas), either said mixture portion does not ignite or if it does ignite the thermal energy developed is so small as to make it possible for the small initial flame to become extinguished as a consequence of the removal of heat by the walls in immediate contact with the flame, in particular by the surface of the sparking plug electrodes. It is for this reason that the ignition system must normally provide an electrical discharge of very long duration between the sparking plug electrodes, so as to increase as far as possible the probability that during the long discharge a mixture portion will present itself at a certain moment between the electrodes which is less weak or less contaminated by burnt gas, and thus finally ignitable. However, if the spark duration necessary to ensure ignition during all the successive cycles is for example one millisecond (in fact even considerably greater durations are necessary), then in one millisecond the drive shaft rotates through 18° at 3000 r.p.m. (and through 36° at 6000 r.p.m.), and consequently in the various successive cycles the actual ignition timing varies over a band which is 18° wide at 3000 r.p.m. (and 36° at 6000 r.p.m.). Thus ignition takes place in all the cycles, but there will be cycles which are considerably advanced or retarded (and thus not optimised from the point of view of thermal efficiency, octane requirement and harmful exhaust emission) which straddle cycles of suitable ignition (and thus optimised). The presence in the combustion chamber of the said internal mixture motion makes the passage of the mixture flow constituted by various portions of different composition more rapid between the sparking plug electrodes. Thus ignition is attained in all cycles over a correspondingly smaller time interval, and the band of variation of the degrees of actual advance is proportionally smaller. Within this band, the cycles are all obviously closer to optimisation conditions.

With regard to the improvement in combustion which (as stated initially) can derive from particular mixture and/or gas turbulence inside the explosion chamber, it should be noted that in the Otto cycle, which is the ideal cycle for internal combustion engines, combustion should take place at constant volume, i.e. during the infinitesimal time period during which the piston can be considered immobile at the top dead center of its stroke. The longer the duration of combustion, the more the actual cycle is removed from the ideal cycle which represents the cycle of maximum efficiency. In fact, in a real cycle the combustion is made to take place partly during the last part of the compression stroke and partly (to completion) during the first part of the expansion stroke. Moreover, the duration of the combustion can be taken as the time employed by the flame front to run from the sparking plug through the internal spaces of the explosion chamber until all (or nearly all) of the mixture contained in the chamber has been burnt. In addition, the speed of propagation of the flame front can as a first approximation be considered as the sum of two speeds, namely the speed of propagation of the flame front through the immobile mixture and the speed due to the internal mixture motion in the explosion chamber. This leads to the said possibility of suitable internal mixture and gas motion improving the progress of the combustion by shortening its duration.

The present invention provides an explosion chamber having a form, deriving from the arrangement of zones of different thickness, such as to promote internal motion in the mixture and gas inside the chamber, which in terms of direction and extent is the most suitable for simultaneously improving both mixture ignition and combustion.

The existence of internal motion in the mixture and gas, i.e. "turbulence" inside the explosion chamber, is known to derive generally essentially from two phenomena. The first of these phenomena, generally known as the swirl effect, consists of the fact that during the piston suction stroke, the mixture (or air in the case of injection feed) acquires a considerable speed in the intake duct and at the valve, which is a multiple of the piston speed, this multiple being higher the greater the ratio of the cylinder cross-section to the duct cross-section (and the passage cross-section at the inlet valve respectively). A considerable part of the kinetic energy of this air jet entering the cylinder is dissipated during the piston suction and compression strokes, but internal motion, known as swirl, remains even during ignition and combustion. The extent of this swirl is modest (but not zero) especially if the passage cross-sections in the ducts and at the valve are large in order to prevent pressure drop and thus reduction in volumetric efficiency, especially at high rotational speed. The second of said two different phenomena is that generally known as the squish effect by which during the last part of the compression stroke in those zones of the chamber characterised by a smaller thickness (i.e. by a smaller distance between the piston and head surfaces), the thickness reduces much quicker on a percentage basis than in the zones of greater thickness, so that part of the mixture is expelled from the first zones towards the second. The internal motion deriving therefrom is more intense the greater the thickness difference between one zone and another of the chamber with the piston at its top dead center. The direction of this motion depends on the relative position of said zones of different thickness.

It is a turbulence of this second type, i.e. of the squish type, which is promoted by the present invention, by suitably optimising the speed and direction of the internal motion in relation to the first of the two said objects, namely that of facilitating mixture ignition. The ignition of the mixture is firstly facilitated because the greater remixing of the mixture, by virtue of said internal motion, tends to make its composition more homogenous in the various zones of the chamber and thus in proximity to the sparking plug, but more especially because when electrical discharge takes place between the sparking plug electrodes, the passage speed of the mixture between the electrodes increases, and thus the possibility of replacing a less ignitable mixture with a more ignitable mixture increases. There is therefore a corresponding reduction in the size of the angle through which the drive shaft rotates from the beginning of discharge to the moment in which ignition occurs, in all the successive cycles.

However, squish turbulence is also characterised by a physical phenomenon which can be said to be symmetrical to that heretofore described (relative to the last part of the compression stroke). In this respect, during the first part of the expansion stroke, in the smaller thickness zones, the percentage thickness increases more rapidly than in the greater thickness zones. The consequence of this is that the fluid rushes into the smaller thickness zone from the greater thickness zones.

If the position of said zones relative to each other and to the sparking plugs is such that said fluid in the greater thickness zones already consists of high temperature burnt gas, this gas increases the local speed of advancement of the flame front as it rushes into the smaller thickness zones (generally characterised by a slower combustion), and thus the time required for completing the combustion is shortened. It is on the basis of these considerations that squish turbulence is used in the present invention in order to attain the second of said stated objects, namely to improve combustion inside the explosion chamber.

In designing and setting up the explosion chamber according to the invention, it has been found that in optimising the direction and extent of the motion obtainable by using squish effects, it must not be ignored that said motion becomes added to the preexisting motion, which may sometimes be small but is not zero, and is of swirl type, i.e. derives both in terms of extent and direction from the mixture jet entering the cylinder through the inlet valve. In particular, it has been found that the pattern and direction of this residual motion are represented by an internal vortex which is coherent with the pattern of the speed in the intake duct in the zone immediately upstream of the inlet valve. In particular, for example, in the case of an engine or an engine block with in-line cylinders and overhead valves, the axis of the intake duct, i.e. the curved line containing the centres of the cross-sections of the duct in the zones upstream of the valve, lie generally in a plane which is normal to the axis of the crankshaft. The axis of the induced vortex is therefore parallel to the axis of the piston pin (and of the crankshaft). The internal motion obtainable by using the squish effect becomes superposed on this preexisting swirl vortex. It has thus been found experimentally that by positioning the smaller thickness zones relative to the larger thickness zones in such a manner in the explosion chamber as to induce a vortex by the squish effect which also has its axis parallel to the axis of the crankshaft (as in the case of the preexisting swirl vortex), ignition and combustion are improved only a little or not at all. The great advantages are attained by positioning said smaller thickness zones in such a manner as to induce a vortex having an axis which tends to be orthogonal relative to the axis of the preexisting swirl vortex. In this manner, the mixture also becomes remixed in that direction for which the preexisting vortex was ineffective.

A further characteristic of the form of the combustion chamber according to the present invention is that not only does it comprise the most suitable positioning and sizing for the chamber zones of smaller thickness as stated, but also comprises in the central part of the chamber, i.e. in proximity to the sparking plug which is generally arranged in the central part, a zone of considerable thickness and as extended as possible, so that it contains a large proportion of the mixture present in the chamber. The duration of combustion is thus shortened not only by the greater speed of advancement of the flame front (promoted by said squish effect) but also by the smaller distance through which the flame front has to travel in burning a very large part of the mixture contained in the explosion chamber. It is from this zone of considerable thickess that during the initial part of the expansion stroke, already burnt gas at high temperature flows towards the smaller thickness zones. In order to facilitate this flow of high temperature gas into the smaller thickness zones, it has also been found advantageous to dispose, along the chamber periphery, zones of intermediate thickness alternating with zones of smaller thickness and thus bordering the zones of smaller thickness. In said zones, the flame still propagates at a considerable speed. Thus gas at high temperature also flows from these zones into the smaller thickness zones, so facilitating rapid and complete combustion in these zones. Rapid and complete combustion in the squish zones, i.e. those of smaller thickness, are essential in order to avoid two important counter-effects which are typical of combustion chambers having a considerable squish effect, namely slowness of combustion in the squish zones in which combustion arrives last, so giving time for the formation of peroxides in these zones, with consequent knocking (so that the octane requirement of the engine increases), and incomplete combustion, which obviously gives rise to an increase in unburnt hydrocarbon emission in the exhaust.

To improve the rapidity and completeness of combustion, the necessary squish area has been divided into two zones in the combustion chamber of the present invention. However, these zones are of different size, so that as the two vortexes produced rotate in opposite directions, not only are local vortexes obtained in the corresponding chamber zones, but also an overall vortex in the chamber taken as a whole, the intensity of which is equal to the difference between the intensity of the vortexes produced by the effect of the two squish zones of different size. If the two zones were of the same size, said overall vortex (used for the overall remixing of the mixture) would be zero.

A final characteristic of the proposed combustion chamber is the correct proportioning of the squish effect by defining the value of the chamber thickness in the smaller thickness zones. In order to obtain the desired effect without running the risk of extinguishing the flame (and thus increasing unburnt hydrocarbon emission), it has been found that the average thickness must lie between 3% and 6% of the diameter of the cylinder bore. Said thickness also increases from the chamber periphery towards the center, for example from 3% to 6% of the diameter for an average thickness of 4.5%. Said correct proportioning of the squish effect by using said thickness values means that the overall length of the smaller thickness zones (when viewing the chamber along the cylinder axis) must be 30%±5% of the total. In the intermediate thickness zones, the optimum thickness has been found to be double the preceding thickness, i.e. an average of 9 mm±1 mm. The optimum overall length of said intermediate thickness zones has been found to be 40%±5% of the total. This means that 30% of the total length remains in the central zone in proximity to the sparking plug for housing the major part of the chamber volume.

The aforesaid can be clearly seen with the aid of the accompanying FIGS. 1, 2 and 3, which show diagrammatically by way of example one possible application of the invention to an engine with in-line cylinders and overhead valves. Said figures refer only to the combustion chamber of one of the cylinders, and in which:

FIGS. 4-9 show the pattern of internal flow in the combustion chamber.

Figure 1:
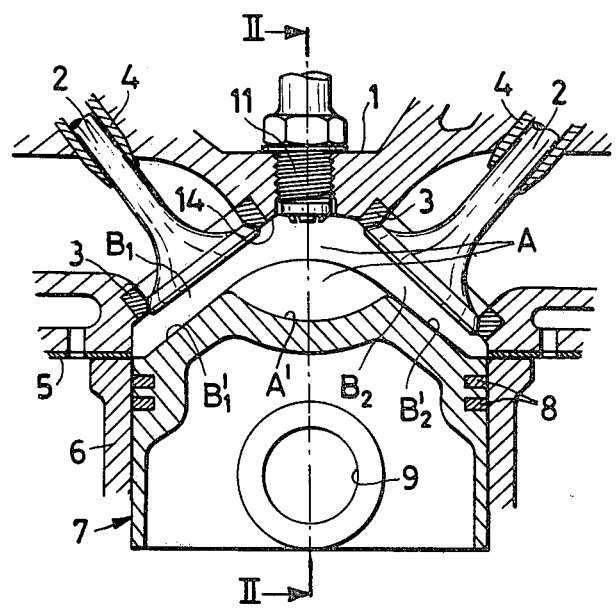
FIG. 1 is a cross-section through the cylinder on the line I—I of FIG. 2, passing through the axis of the cylinder and through the axis of the sparking plug, and thus normal to the axis of the piston pin and to the axis of the rotation of the crankshaft.
Figure 2:
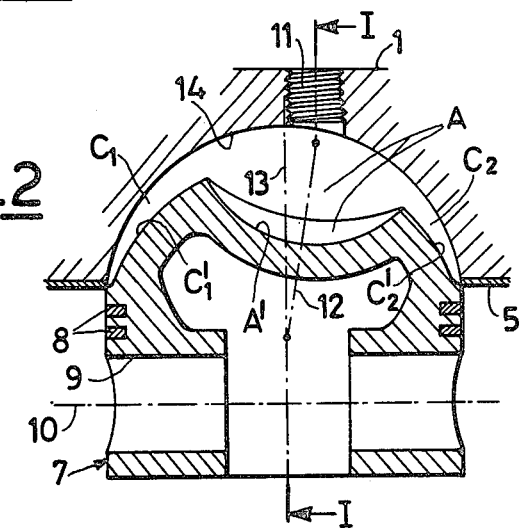
FIG. 2 is a section through the chamber on the line II—II of FIG. 1, passing through the axis of the cylinder and containing the axis of the piston pin, and thus perpendicular to the plane of the section of FIG. 1.
Figure 3:
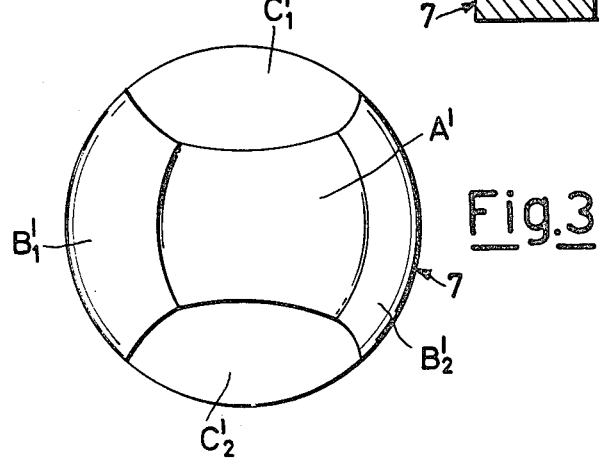
FIG. 3 is a view of the surface of the piston at the combustion chamber end, said view being in the direction of the cylinder axis.

The figures show the head 1, the wall 14 provided in the head which bounds the combustion chamber and is in the form of a spherical cap, the inlet and exhaust valves 2, the valve seats 3 provided in the head, the valve guides 4, the gasket 5 between the head, liner and engine block (the engine block is not shown in the figures), the liner 6, the piston 7 provided with the rings 8, the bore 9 in the piston for housing the pin (not shown in the figure), the dashed and dotted line 10 representing the pin axis (parallel to the crankshaft axis), and the sparking plug 11 (or the housing for the sparking plug in the head). In FIGS. 1, 2 and 3, the letter A represents the greatest thickness zone of the combustion chamber in proximity to the sparking plug, the letters $B_1$ and $B_2$ indicate the intermediate thickness zones, the letter $C_1$ indicates the more extensive smallest thickness zone, and the letter $C_2$ indicates the less extensive smaller thickness zone. The piston 7 is formed with a crown and the letters $A'$, $B_1'$, $B_2'$, $C_1'$ and $C_2'$ indicate the wall portions of the piston crown which are in contact with said zones. As can be seen from FIG. 2, the zones $C_1$ and $C_2$ are essentially disposed at the ends of a diameter of the piston which is parallel to the axis of the pin 9, and are separated from each other by the greatest thickness zone A and the intermediate thickness zones $B_1$ and $B_2$. The piston crown wall portions $C_1'$ and $C_2'$ are essentially convex, and form part of a spherical cap having its center on the piston axis at a point displaced downwards from the centre of the spherical cap wall 14 of the head.

The piston crown wall portion $A'$ is concave, and is essentially in the form of a concave cap of a solid of rotation (ellipsoid or sphere) having its axis of symmetry skew to the axis of the cylinder. FIG. 2 shows how the different extension of the wall portions $C_1'$ and $C_2'$ is obtained by disposing the intersection of the axis of symmetry of the wall portion A with a plane containing the axis of the cylinder and the axis of the pin, on a straight line 12 which passes through the center of the essentially spherical cap-shaped concave wall 14 of the head, said straight line forming an angle with the cylinder axis 13. The greater this angle, the greater is the difference in extension between the two wall portions $C_1'$ and $C_2'$, and the greater the extent of the vortex resulting from the sum of the two vortexes of opposite sign. In order for the two vortexes and the resultant vortex to have their axis normal to the axis of the preexisting vortex due to the inlet swirl, the plane containing the cylinder axis and said straight line is substantially orthogonal to the plane containing the middle curved line which constitutes the axis of the inlet duct upstream of the inlet valve.

A further clarification with regard to the pattern of the internal flow in the mixture and gas in the combustion chamber which arises with the particular chamber design according to the present invention is given by FIGS. 4 to 9. FIG. 4 shows the same combustion chamber section as FIG. 2 (i.e. on a plane passing through the cylinder axis and containing the axis of the piston pin, and thus also the crankshaft axis). However, in contrast to FIG. 2, in FIG. 4 the piston is not at its top dead center and instead is approaching its top dead center as indicated by the arrow F1. Because of the squish effect, as stated, the mixture is expelled during this stage from the smaller thickness zones $C_1$ and $C_2$. In FIG. 4, the dashed lines diagrammatically indicate the flow lines deriving from this squish effect for the two vortexes of opposite sign and different intensity. In FIG. 5, which shows a view on the axis of the combustion chamber cylinder, the dashed lines indicate the lines of flow of the mixture when the piston is in the position of FIG. 4, i.e. is approaching its top dead centre. In FIG. 6, which is analagous to FIG. 4 with the exception that its piston is at rest at its top dead center, the dashed lines indicate the lines of flow for the vortexes which persist in the explosion chamber and essentially in the greater thickness zone A of the chamber, said zone being essentially characterised by an axial symmetry about the straight line containing the centers of the two spherical surfaces of the chamber (the concave surface of the head 14 and the concave surface $A'$ of the piston), the two vortexes in this stage tending to join into a single toric vortex, the circularly closed axis of which is represented by the dashed and dotted line 14 of FIG. 7 (in which the chamber is shown in a view taken along the cylinder axis, in the position of FIG. 6). Lastly, FIGS. 8 and 9 show the pattern of the flow lines, essentially for high temperature burnt gas, when the piston is moving away at the beginning of the expansion stroke (as indicated by the arrow F2) from the top dead center position. In this stage, the squish effect is "symmetrical" as stated heretofore, to that of FIGS. 4 and 5. The high temperature gas is driven towards the lesser thickness zones $C_1$ and $C_2$ so as to facilitate rapid and complete combustion.

In the embodiment shown in the figures, the various chamber zones have the sizes indicated heretofore as the most advantageous, and this means that of the area of the piston crown wall when viewed along the cylinder axis, 30% corresponds to the smallest thickness zones (20% for zone $C_1$ and 10% for zone $C_2$) with a volume which is about 10% of the total chamber volume, 40% of said area of the piston crown wall corresponds to the intermediate thickness zones with a volume of about 30% of the total, and finally 30% of the area corresponds to the greatest thickness zone with a volume of about 60% of the total.

I claim:

1. A combustion chamber for a cylinder of a reciprocating internal combustion engine of the type including an engine block defining a cylinder having a piston disposed therein for reciprocating movement, said piston having a pin bore for receiving a piston pin, and an engine head secured to said engine block, said head having formed therein intake and exhaust ducts for said cylinder, the inlet and exhaust valves having heads for selectively closing said intake and exhaust ducts, said combustion chamber lying between a wall provided in said engine head in which are seatable said heads of said inlet and exhaust valves and a crown of said piston, said wall provided in said engine head being essentially in the form of a spherical cup, said combustion chamber being characterised in that said piston crown comprises five wall portions of which:

- a first wall portion and a second wall portion are fundamentally convex and form part of a surface in the form of a spherical cap having its center on the piston axis at a point displaced downwards from the center of said spherical cup provided in said head, said first and second wall portions being disposed in proximity to the piston periphery in positions corresponding with the ends of a piston diameter which is parallel to the piston pin bore axis, the surface of one of said first and second wall portions being greater than the surface of the other of said first and second wall portion;
- a third wall portion and a fourth wall portion are fundamentally flat and are disposed in proximity to the piston periphery respectively below said inlet valve head and said exhaust valve head, said third and fourth wall portions being joined to said first and second wall portions;
- a fifth wall portion fundamentally in the form of a concave cap of a solid of rotation having an axis of symmetry skew to the cylinder axis, said fifth wall portion being disposed in a central part of said piston crown and being joined to said first, second, third and fourth wall portion, the volume of said combustion chamber with the piston at a top dead center position having a greatest thickness in a zone in contact with said fifth wall portion of said piston crown, having an intermediate thickness in zones in contact with said third and fourth wall portions of said piston crown, and having a smallest thickness in zones in contact with said first and second wall portions of said piston crown; and
- a sparking device carried by said engine head and having a sparking point in said combustion chamber, said sparking point lying in a plane passing through said piston pin bore axis and said cylinder axis and being offset to one side of said cylinder axis.

2. A combustion chamber as claimed in claim 1, wherein said fifth wall portion of said piston crown is substantially in the form of a concave spherical cup.

3. A combustion chamber as claimed in claim 1, wherein said fifth wall portion of said piston crown is substantially in the form of a concave ellipsoidal cup.

4. A combustion chamber as claimed in claim 1, wherein the axis of symmetry of the solid of rotation of which said fifth wall portion of said piston crown forms part intersects a plane containing the cylinder axis and the piston pin axis at a point disposed on a straight line passing through the center of the wall formed in said engine head and inclined to said cylinder axis.

5. A combustion chamber as claimed in claim 1, wherein its volume in the zones in contact with said first and second wall portion of the piston crown has a thickness which increases from the periphery towards the center of said combustion chamber with an average thickness between 3% and 6% of the diameter of said cylinder.

6. A combustion chamber as claimed in claim 1, wherein of said first and second wall portions of said piston crown, one has substantially double the surface area of the other.

7. A combustion chamber as claimed in claim 1, wherein said first and second wall portions of said piston crown have a total surface area which is between 25 and 35% of the total surface area of said piston crown wall.

8. A combustion chamber as claimed in claim 1 wherein said engine head carries said sparking device having said sparking point in said combustion chamber and along said axis of symmetry of said fifth wall portion.

* * * * *